US008699599B2

(12) United States Patent
Eckert

(10) Patent No.: US 8,699,599 B2
(45) Date of Patent: Apr. 15, 2014

(54) METHOD FOR DEFINING A SEARCH SEQUENCE FOR SOFT-DECISION SPHERE DECODING ALGORITHM

(75) Inventor: Sebastian Eckert, Burgstaedt OT Mohsdorf (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 227 days.

(21) Appl. No.: 13/284,141

(22) Filed: Oct. 28, 2011

(65) Prior Publication Data

US 2012/0106666 A1 May 3, 2012

(30) Foreign Application Priority Data

Oct. 29, 2010 (EP) .................................... 10189401
Dec. 1, 2010 (EP) .................................... 10193318

(51) Int. Cl.
*H04L 5/12* (2006.01)
*H04L 23/02* (2006.01)

(52) U.S. Cl.
USPC ........................................ 375/261; 375/340

(58) Field of Classification Search
USPC ................. 375/260–262, 265, 316, 340, 341; 714/794–795
See application file for complete search history.

(56) References Cited

U.S. PATENT DOCUMENTS

| 8,117,522 | B2* | 2/2012 | Kim et al. ...................... 714/794 |
| 2005/0175122 | A1* | 8/2005 | Nefedov et al. ............... 375/323 |
| 2007/0286313 | A1 | 12/2007 | Nikopour-Deilami | |
| 2008/0153444 | A1 | 6/2008 | Chen | |
| 2008/0165878 | A1* | 7/2008 | Kajihara ........................ 375/264 |
| 2010/0014606 | A1* | 1/2010 | Chen et al. .................... 375/262 |
| 2012/0121047 | A1* | 5/2012 | Jia et al. ........................ 375/341 |
| 2012/0269303 | A1* | 10/2012 | Paker et al. ................... 375/341 |

OTHER PUBLICATIONS

European Search Report for Application No. 10193318.2-1237, (Jan. 2012).

* cited by examiner

*Primary Examiner* — Jean B Corrielus
(74) *Attorney, Agent, or Firm* — SpryIP, LLC

(57) ABSTRACT

A low complexity method for determining a search sequence of nodes for an efficient soft-decision sphere decoding algorithm for use in receivers for quadrature amplitude modulation (QAM) communication signals is achieved by determining a first member of the search sequence by rounding a received symbol (z) to a first constellation symbol ($x_c$) of the QAM constellation, classifying the remaining constellation symbols ($x_i$) of the QAM constellation into a plurality of sub-sets of constellation symbols having the same distance metric relative to said first constellation point ($x_c$) according to a metric $d_{sequ(n)}=2a \cdot n=\max\{|\text{real}(x_c-x_i)|,|\text{imag}(x_c-x_i)|\}$, a being a scaling factor of the constellation grid, and ordering said sub-sets of constellation symbols in ascending order of their distance metric relative to the first constellation symbol ($x_c$), and ordering the members of each sub-set of constellation symbols that are defined by the same distance metric according to their Euclidean distances.

3 Claims, 3 Drawing Sheets

CLASSIFICATION OF CONSTELLATION SYMBOLS ACCORDING TO METRIC $d_{sequ(n)}$ WITH ORDERING n=1,2,3,

ORDERING OF A SUB-SET OF QAM SYMBOLS

METHOD FOR DEFINING A SEARCH SEQUENCE FOR SOFT-DECISION SPHERE DECODING ALGORITHM

CROSS REFERENCE TO RELATED APPLICATIONS

This application claims priority of European application no.: 10189401.2 filed on Oct. 29, 2010 and European application no.: 101633182 filed on Dec. 1, 2010, the entire contents of both applications being hereby incorporated by reference herein.

FIELD OF THE INVENTION

The invention relates to a method for defining a search sequence for a soft-decision sphere decoding algorithm for use in receivers for quadrature amplitude modulation (QAM) communication signals.

BACKGROUND OF THE INVENTION

The system model of MIMO-OFDM systems using $N_T$ transmit and $N_R$ receive antennas can be described in the frequency domain for every OFDM subcarrier individually by the received signal vector $y=[y_1, \ldots, y_{N_R}]^T$, the $N_R \times N_T$ channel matrix H, the transmitted symbol $x=[x_1, \ldots, x_{N_T}]^T$, and a disturbance vector $n=[n_1, \ldots, n_{N_R}]^T$ which represents the thermal noise on the receive antennas. The following equation then describes the transmission model:

$$y = H \cdot x + n \tag{1}$$

The elements of the transmitted symbol vector x are complex valued QAM symbols taken from a QAM modulation e.g. 4-QAM, 16-QAM, or 64-QAM. Depending on the modulation alphabet, every QAM symbol is associated to a number of transmitted bits $N_{Bit}$, with $$N_{Bit} = \begin{cases} 2 & \text{for } 4-QAM \\ 4 & \text{for } 16-QAM \\ 6 & \text{for } 64-QAM \end{cases}$$

The elements of the channel matrix $h_{i,j}$ are also complex valued. They are estimated by the receiver.

At a certain stage of the signal processing chain the receiver computes softbits for every transmitted bit associated to the transmitted symbol vector x. Several methods are known for this purpose, with different error probabilities and different computational complexities. One near-optimal approach in terms of error probability is soft-decision sphere decoding.

A soft-decision sphere decoder takes the received signal vector y and the channel matrix H as input and outputs a softbit (i.e. a likelihood value) for every bit associated to x. When denoting the bits associated to $x_j$ (the QAM symbols of the j-th transmit antenna) by $[b_{j,1}, \ldots, b_{j,n}, \ldots, b_{j,Nbit(j)}]$, a softbit $\rho_{j,n}$ is defined by the following Euclidean distances:

$$d_{0,j,n}^2 = \min_{x_{0,j,n}} \{\|y - H \cdot x_{0,j,n}\|^2\} \tag{2}$$

$$d_{1,j,n}^2 = \min_{x_{1,j,n}} \{\|y - H \cdot x_{1,j,n}\|^2\}$$

wherein $d_{0,j,n}^2$ and $d_{1,j,n}^2$ are the minimum Euclidean distances between the received signal vector y and all possible combinations of transmit symbols x, with the restriction that $x_{0,j,n}$ represents all those combinations of x for which the n-th bit of the j-th transmit antenna is zero. On the other hand, $x_{1,j,n}$ represents all those combinations of x for which the n-th bit of the j-th transmit antenna is one. The softbit for the n-th bit of the j-th transmit antenna is given by $$\rho_{j,n} = d_{0,j,n}^2 - d_{1,j,n}^2 \tag{3}$$

A straight-forward algorithm would have to consider all combinations of x in the above equations in order to compute the softbits for one OFDM subcarrier. Since this approach is computationally very intensive and implies an exponential complexity, soft-decision sphere decoding algorithms have been proposed as a way to simplify the search. The simplification is achieved by QR decomposition of the channel matrix H followed by a tree search.

QR decomposition decomposes the channel matrix H into a orthogonal rotation matrix Q and an upper triangular matrix R, such that $H = Q \cdot R$. Since rotation by Q does not influence the Euclidean distances in the above equations, one can simplify the Euclidean distances $d_{0,j,n}^2$ and $d_{1,j,n}^2$ by $$d_{0,j,n}^2 = \min_{x_{0,j,n}} \{\|y' - R \cdot x_{0,j,n}\|^2\} \tag{4}$$

$$d_{1,j,n}^2 = \min_{x_{1,j,n}} \{\|y' - R \cdot x_{1,j,n}\|^2\}$$

with $y' = Q^H \cdot y$.

A second step of the sphere decoding algorithm is the tree search.

The Euclidean distance from above, $d^2 = \|y' - R \cdot x\|^2$, can be separated into partial Euclidean distances $p_1^2, \ldots, p_{N_T}^2$ as follows:

$$d^2 = \left\| \begin{pmatrix} y_1' \\ \ldots \\ y_{N_T}' \end{pmatrix} - \begin{pmatrix} r_{11} & \ldots & r_{1N_T} \\ 0 & \ldots & \ldots \\ 0 & 0 & r_{N_T N_T} \end{pmatrix} \begin{pmatrix} x_1 \\ \ldots \\ x_{N_T} \end{pmatrix} \right\|^2 = p_1^2 + \ldots + p_{N_T}^2 \tag{5}$$

with, $$p_{N_T}^2 = \|y_{N_T}' - r_{N_T N_T} \cdot x_{N_T}\|^2 \tag{6}$$

$$p_1^2 = \|y_1' - r_{11} \cdot x_1 - \ldots - r_{1N_T} \cdot x_{N_T}\|^2 \tag{7}$$

More generally, the partial Euclidean distances at a level k of a search tree are expressed as:

$$p_k^2 = \left\| y_k' - \sum_{j=k}^{N_T} r_{kj} \cdot x_j \right\|^2 \tag{8}$$

The partial Euclidean distances separate the original Euclidean distance into $N_T$ portions. Due to the upper triangular structure of the R matrix, the partial Euclidean distances also separate the distance computation from the possibly transmitted QAM symbols $x_1, \ldots, x_{N_T}$ such that $p_{N_T}^2$ only depends on the QAM symbol $x_{N_T}$ and is not dependent on $x_1, \ldots, x_{N_T}-1$. Also, $p_{N_T-1}^2$ only depends on $x_{N_T}$ and $x_{N_T}-1$, and is not dependent on $x_1, \ldots, x_{N_T}-2$. This kind of dependency separation is utilized by the sphere decoding tree search in order to find the "closest" possible transmit symbol vector $x_{min}$.

The sphere decoding tree search assumes a maximum Euclidean distance $d_{max}^2$ which is definitely smaller than the Euclidean distance of the "closest" transmit symbol vector $x_{min}$. If now the search would start by choosing a candidate for $x_{N_T}$, the partial Euclidean distance $p_{N_T}^2$ is determined, in case of $p_{N_T}^2 > d_{max}^2$, all the Euclidean distances $d^2$ for all possible combinations of $x_1, \ldots, x_{N_T}-1$ (assuming the chosen $x_{N_T}$) will also exceed the maximum search radius $d_{max}^2$. Therefore, the search can skip computing the partial Euclidean distance $p_1^2, \ldots, p_{N_T}-1^2$, and can continue with another candidate for $x_{N_T}$.

This search procedure can be illustrated as a tree search as depicted in FIG. 1. The search tree consists of $N_T$ levels, that correspond to the QAM symbols of the different transmit antennas. In FIG. 1 $N_T=3$ is assumed. Each tree node is associated to one possible QAM symbol $x_1, \ldots, x_{N_T}$. Therefore, the leave nodes of the tree represent all possible combinations of x.

In the example above, with $p_{N_T}^2 > d_{max}^2$, after choosing a candidate for $x_{N_T}$, the complete sub-tree below the chosen $x_{N_T}$ would be skipped during the sphere search.

For finding the "closest" transmit symbol vector x, the maximum Euclidean distance $d_{max}^2$ is initialized with $\infty$ (infinity). This means, that the partial Euclidean distances never exceed the limit, and that the sphere search reaches the bottom level after $N_T$ depth-first steps. The resulting Euclidean distance $d^2$ then provides an update of the maximum search distance $d_{max}^2$. The sphere search would now continue and try to update $d_{max}^2$ if the bottom level of the tree is reached and if the resulting Euclidean distance would shrink $d_{max}^2$.

The result of this search process is $d_{max}^2$ being the Euclidean distance according to the "closest" possible symbol vector $x_{min}$. If $x_{min}$ is restricted to certain bits being 0 or 1, the search tree can be adopted accordingly such that the search tree is built upon QAM symbols which meet the respective restrictions.

FIG. 2 illustrates an improvement of the sphere search by ordering the sibling nodes at a tree level k by increasing partial Euclidean distances $p_k^2$.

In a case where the maximum search distance $d_{max}^2$ is exceeded at a tree level k (solid tree node) and the partial Euclidean distances $p_k^2$ are not ordered, the search would continue with the next candidate node (the respective QAM symbol $x_k$) on the same level (arrow "A"). However, if the nodes in the tree are ordered by increasing $p_k^2$, the search can continue with the next node at level k−1 (arrow "B"). This is, permissible simply because due to the ordering of the sibling nodes the next candidate at the same level k would also exceed the maximum search distance $d_{max}^2$. In this case, the sub-tree which is skipped during the sphere search is much larger, and thus search complexity is much lower.

It will be understood from the above that ordering of the sibling nodes by increasing partial Euclidean distances is essential for any efficient sphere decoding algorithm. Thus, a general task is to find a sequence of complex QAM symbols $x_i$ sorted by the partial Euclidean distance relative to a complex valued receive point z.

For a 64-QAM, this means that at a search tree level k the ordering algorithm would have to sort all 64 QAM symbols according to the partial Euclidean distance $p_k^2$ $$p_k^2 = \|z - r_{kk} \cdot x_k\|^2. \quad (9)$$

with $$z = y_k' - \sum_{j=k+1}^{N_T} r_{kj} \cdot x_j.$$

This ordering algorithm would have to be performed for every parent node in the search tree which is visited during the sphere search, i.e. for all visited nodes of the search tree except those at tree level 1. Furthermore, for practical implementations the ordering algorithm has to be performed in parallel to the sphere search, therefore this algorithm has to output a "next ordered" node within every clock cycle.

An object of the invention is to provide a low complexity method for determining a search sequence of nodes for a soft-decision sphere decoding algorithm.

SUMMARY OF THE INVENTION

According to the invention there is provided a method for defining a search sequence for a soft-decision sphere decoding algorithm for use in receivers for quadrature amplitude modulation (QAM) communication signals.

The method comprises determining a first member of the search sequence by rounding a received symbol to a first constellation symbol of a plurality of constellation symbols which form a QAM constellation, said first constellation symbol being the constellation symbol closest to the received symbol, and determining the remaining members of the search sequence by (1) classifying, with a processing unit, the remaining constellation symbols of the QAM constellation into a plurality of sub-sets of constellation symbols having the same distance metric relative to said first constellation symbol according to a metric $d_{sequ(n)} = 2a \cdot n = \max\{|\text{real}(x_c - x_i)|, |\text{imag}(x_c - x_i)|\}$, wherein a is a scaling factor of the constellation grid, the constellation symbols being spaced by 2a in both horizontal and vertical directions, and ordering said sub-sets of constellation symbols in ascending order of their distance metric relative to the first constellation symbol, and (2) ordering the members of each sub-set of constellation symbols that are defined by the same distance metric according to their Euclidean distances.

One or more aspects of the present invention are performed by a processing unit, including but not limited to, a processor or other device capable of performing the algorithm or steps thereof. The processing unit may be implemented in a receiver for QAM communication signals, or in a separate device connected to and/or associated with the receiver.

The disclosed method is an approximate solution to the general task of ordering all QAM symbols of a specific constellation according to their partial Euclidean distances as expressed by (9), however, it is accurate enough for practical soft-decision sphere decoding. The computational complexity of the presented approach is much lower than it is for exact Euclidean distance ordering. The invention can be used for all sphere-decoding applications, in particular in MIMO-OFDM receiver implementations.

In contrast to known ordering methods which use exact Euclidean distance ordering or look-up-table based approaches, the invention provides an efficient method for ordering the complex QAM symbols $x_i$ relative to a complex valued receive point z. The disclosed approach provides a solution for the stated problem with much lower computational complexity, since the multiplication required in (9) to compute the power of 2 is eliminated. Another advantage of the method according to the invention is that one ordered QAM symbol is output every clock cycle which means that the ordering can be applied in parallel to the sphere search since it does not require any pre-computation. Also, no look-up-tables are required for the ordering algorithm.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 1:
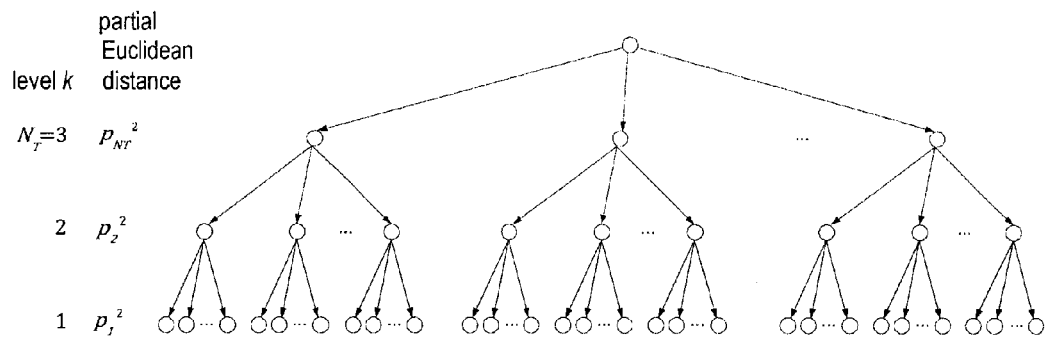
FIG. 1 illustrates a tree search scheme.
Figure 2:
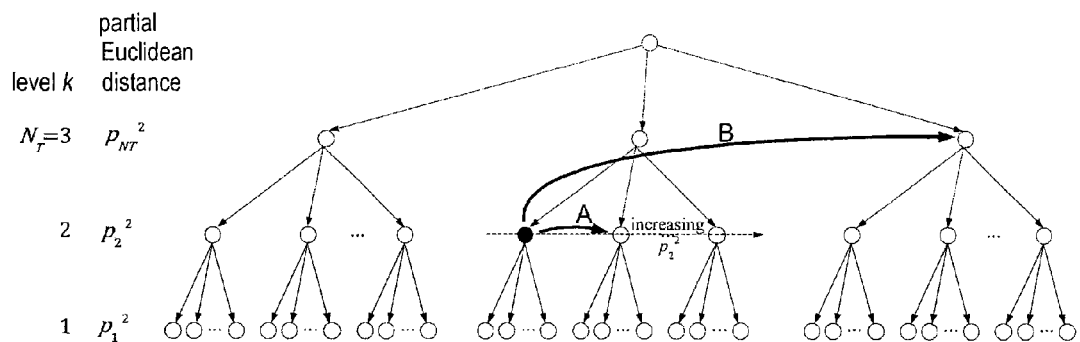
FIG. 2 illustrates an optimization of sphere search in the tree search scheme of FIG. 1.
Figure 3:
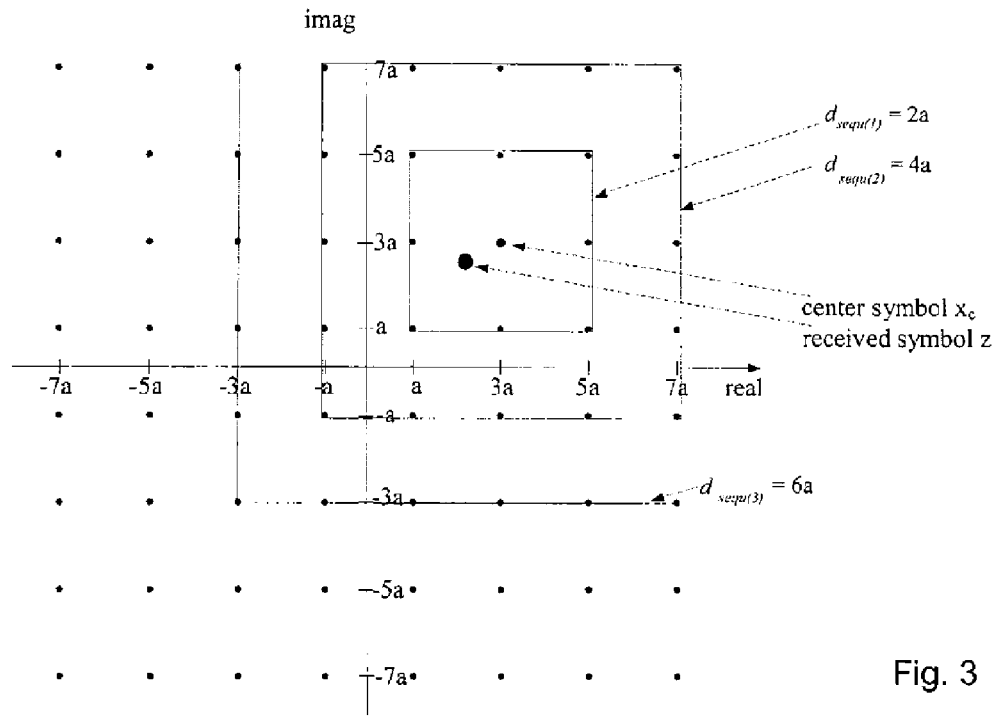
FIG. 3 shows a complex grid of a 64-QAM constellation.

The ordering method of the invention will now be described with reference to FIG. 3 and FIG. 4. FIG. 3 shows the complex grid of a 64-QAM constellation. The QAM symbols $x_i$ are arranged on discrete real and imaginary positions $\pm a, \ldots, \pm 7a$, wherein a is a scaling factor depending on the application, i.e. the channel. A received symbol z is shown in the figure as an enlarged solid point.

The proposed ordering algorithm starts with rounding z to the closest QAM symbol which is referred to as the center symbol x, below. Since the complex grid is discrete, this operation is very simple. The algorithm outputs the center symbol as the first ordered QAM symbol.

The next member QAM symbols $x_i$ of the search sequence are defined using the following metric:

$$d_{sequ(n)} = 2a \cdot n = \max\{|\text{real}(x_c - x_i)|, |\text{imag}(x_c - x_i)|\} \quad (10).$$

This metric defines a plurality of concentric squares around the center symbol $x_c$, as illustrated in FIG. 3 which shows a small square for $d_{sequ(1)} = 2a$ and a larger square with $d_{sequ(2)} = 4a$. Each of the metrics $d_{sequ(n)}$, with $n=1 \ldots 7$ for the case of a 64-QAM, defines a sub-set of constellation symbols.

According to the invention, the next members of the search sequence are defined by ordering the constellation symbols according to the metric (10) in ascending order of their distance metrics relative to the center symbol $x_c$ and by ordering the members of each sub-set of constellation symbols that is defined by the same distance metric according to their Euclidean distances.

For the exemplary received symbol z which is illustrated in FIG. 3, the center symbol forms the first member of the search sequence, the $2^{nd}$ to $9^{th}$ members of the search sequence are defined by the small square, i.e. by $d_{sequ(1)}$ relative to the center symbol, the $10^{th}$ to $25^{th}$ members of the search sequence are defined by the large square, i.e. by $d_{sequ(2)}$, the $26^{th}$ to $36^{th}$ members of the search sequence are defined by $d_{sequ(3)}$, the $37^{th}$ to $49^{th}$ members of the search sequence are defined by $d_{sequ(4)}$, and the $50^{th}$ to $64^{th}$ members of the search sequence are defined by $d_{sequ(5)}$ which gives a complete enumeration of the symbols of a 64 QAM constellation.

It will be noted here that the ordering algorithm considers the constrained grid given by the QAM modulation. In other words, constellation symbols that are defined by a metric $d_{sequ(n)}$ do not necessarily form a complete square around the center symbol. Rather, square edges are ignored during the ordering process, as is the case for metrics $d_{sequ(3)}$ to $d_{sequ(5)}$ for the exemplary received symbol illustrated in FIG. 3 and received symbol z1 of FIG. 5, and also for metrics $d_{sequ(1)}$ to $d_{sequ(7)}$ relative to receive received symbol z2 of FIG. 5.

The number of QAM symbols with the same distance metric shall be denoted by $N_d$. In FIG. 3, $N_d=8$ for $d_{sequ(1)}=2a$, and $N_d=16$ for $d_{sequ(2)}=4a$. A very important aspect for the accuracy of the ordering method of the invention is to order the $N_d$ QAM symbols with the same $d_{sequ(n)}$ according to their Euclidean distances. Simulations have shown that omitting an optimized ordering among the sub-set of QAM symbols that is defined by a specific $d_{sequ(n)}$ results in a significant performance decrease of the overall sphere decoding algorithm.

Figure 4:
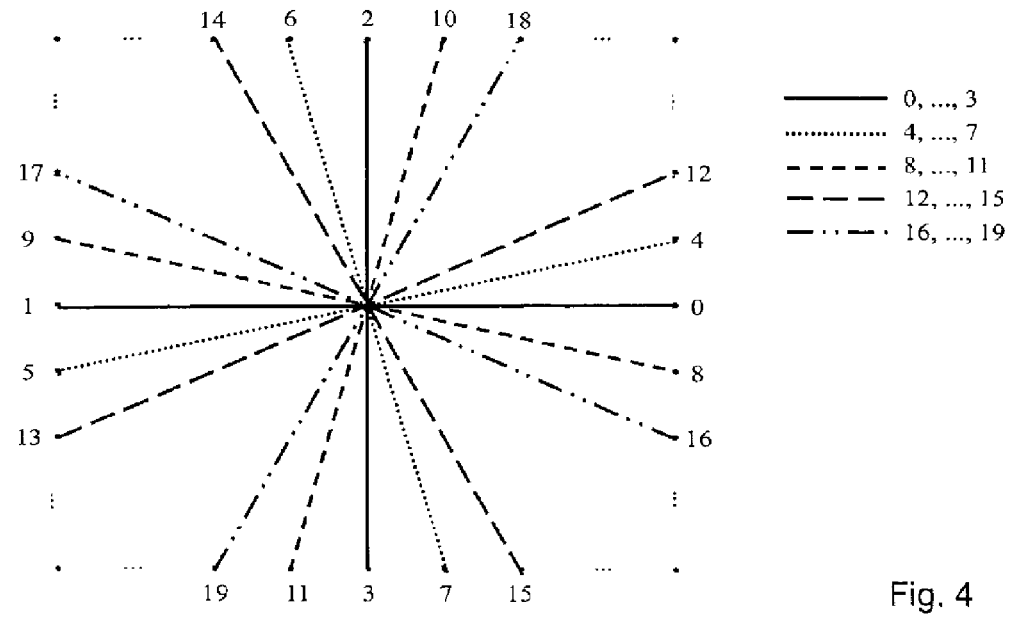
FIG. 4 shows an ordering sequence for a sub-set of QAM symbols defined by the same distance metric.

FIG. 4 illustrates one exemplary embodiment of ordering the $N_d$ QAM symbols with the same $d_{sequ(n)}$ according to their Euclidean distances. The ordering sequence $\{0, 1, \ldots, N_d-1\}$ is given by the annotation in FIG. 4. It will be obvious from the figure that the constellation points identified by 0, 1, 2, and 3 have the smallest Euclidean distances from the center which forms the crossing point of a virtual pair of horizontal and vertical axes with "0" at the right end and "1" at the left end of the horizontal axis and "2" at the upper end and "3" at the lower end of the vertical axis. Also, it will be obvious from the figure that the constellation points in the corners have the largest Euclidean distances from the center.

Accordingly, the first four QAM symbols $\{0, 1, 2, 3\}$ of a sub-sequence which comprises the members of a sub-set of constellation symbols that is defined by a certain n of the distance metric $d_{sequ(n)}$ are those having the same real or imaginary coordinate as the center symbol. Therefore, the first four ordered QAM symbols are on a virtual pair of horizontal and vertical axes, respectively, which axes are in parallel with the coordinate axes of FIG. 3 and cross in the center symbol $x_c$ found by the rounding operation.

In the exemplary embodiment of FIG. 4, the next four ordered QAM symbols $\{4, 5, 6, 7\}$ are given by rotating the horizontal and vertical axis by +1 symbol space (i.e. by 2a) of the member symbols of the sub-set of constellation symbols defined by $d_{sequ(n)}$. $\{8, 9, 10, 11\}$ is given by rotating the axis by -1 symbol space (i.e. by -2a).

The next four ordered QAM symbols $\{12, 13, 14, 15\}$ are given by rotation of the horizontal and vertical axis by +2 symbol spaces, the next four ordered QAM symbols $\{16, 17, 18, 19\}$ are given by the reverse rotation by -2 symbol spaces. The last 4 ordered QAM symbols $\{N_d-4, \ldots, N_d-1\}$ are those residing in the square corners.

It is equally possible to reverse the sense of rotation, i.e. first rotating the pair of horizontal and vertical axes clockwise to define QAM symbols $\{4, 5, 6, 7\}$, then counter-clockwise to define QAM symbols $\{8, 9, 10, 11\}$, then clockwise again, by two symbol spaces to define QAM symbols $\{12, 13, 14, 15\}$ and so on.

The sequence of constellation symbols as depicted in FIG. 4 is but one embodiment for ordering the member symbols of each sub-set of constellation symbols that are defined by the same distance metric. More generally, if the sub-set of constellation symbols defined by a certain n of the distance metric according to (10) forms a complete square around a center symbol, it comprises quadruplets of constellation symbols having the same Euclidean distance relative to this center symbol $x_c$. Generally, according to the invention, these quadruplets are ordered into a sequence with ascending Euclidean distance of the quadruplets. When imagining a 2D coordinate system with the crossing point of the axes at $x_c$, sets of constellation symbols having the same Euclidean distance relative to $x_c$ are defined by $$\{(+2an, +/-2am), (-2an, -/+2am), (-/+2am, +2an), (+/-2am, -2an)\} \quad (11)$$

for m=0 ... n, as far as these points fall into the QAM constellation. Expression (11) gives a first quadruplet with the smallest Euclidean distance relative to the first constellation symbol ($x_c$) for m=0 at $\{(+2an,0), (-2an,0), (0,+2an), (0,-2an)\}$, i.e. including the symbols having the same real or imaginary coordinate as the first constellation symbol $x_c$. Also, expression (11) gives a last quadruplet with the largest Euclidean distance relative to the first constellation symbol ($x_c$) for m=n at $\{(+2an,+2an), (-2an, -2an), (-2an,+2an), (+2an,-2an)\}$, i.e. including the symbols at the corners of the square defined by the same distance metric. Furthermore, expression (11) gives pairs of quadruplets with the same Euclidean distance relative to the first constellation symbol $x_c$ for m=1 ... (n−1). However, in case the constellation symbols that are defined by a metric $d_{sequ(n)}$ with a specific n do not form a complete square due to the constraints of the grid given by the QAM modulation, there won't be quadruplets or pairs of quadruplets with the same Euclidean distance relative to the center symbol $x_c$ but sets of less than eight symbols having the same Euclidean distance. For example in FIG. 5, $d_{sequ(1)}$ relative to receive symbol z2 only defines three members that fall into the constellation, and $d_{sequ(2)}$ relative to receive symbol z2 only defines five members that fall into the constellation. Among the three members defined by $d_{sequ(1)}$, the symbols designated "2" and "3" form a set having the same Euclidean distance relative to the center symbol which is designated by "1". Among the five members defined by $d_{sequ(2)}$, the symbols designated "5" and "6" form a set having the same Euclidean distance relative to the center symbol "1", and the symbols designated "7" and "8" form a set having the same Euclidean distance relative to the center symbol "1" and larger than that of symbols "5" and "6".

Generally, the ordering sequence among the quadruplets of QAM symbols can be any. To randomize and minimize the error introduced by the proposed approximation algorithm, it is however preferred to predefine a succession of these symbols and to maintain this succession for any quadruplet or pair of quadruplets throughout the algorithm. In the exemplary embodiment illustrated in FIG. 4 the same succession of symbols {east, west, north, south} is applied throughout the algorithm.

Figure 5:
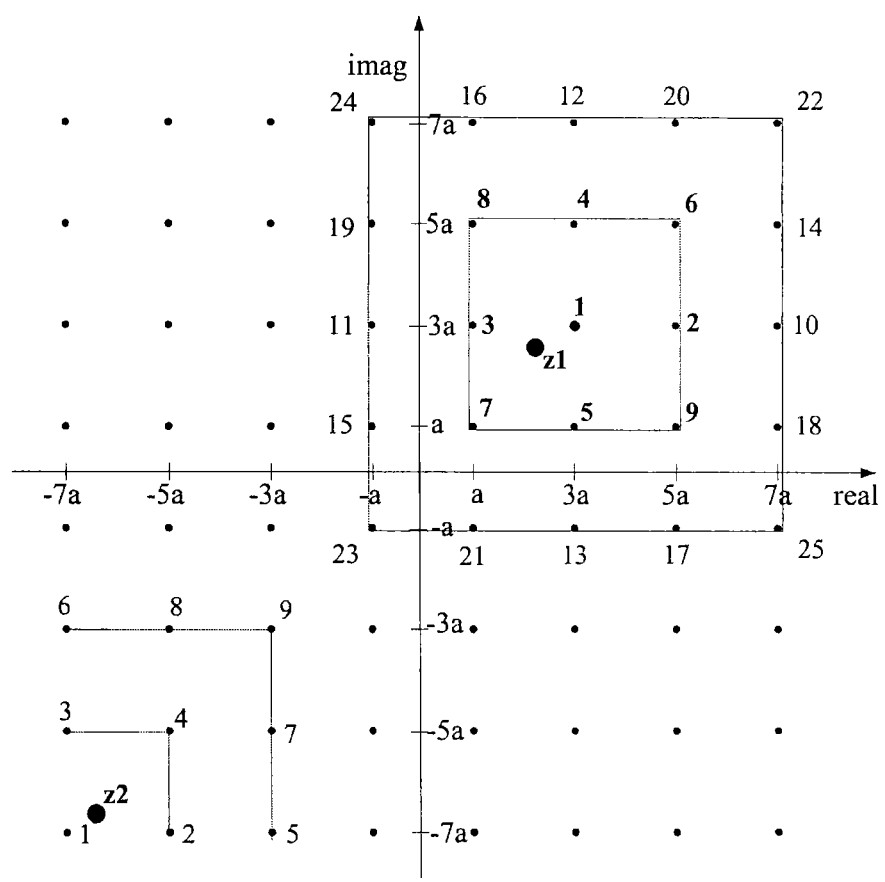
FIG. 5 shows two exemplary ordering sequences for two different received symbols.

FIG. 5 shows two exemplary ordering sequences for two different received symbols z1 and z2 using the exemplary ordering scheme of FIG. 4.

The disclosed ordering method provides an approximate solution for the task of defining a search sequence of QAM symbols for sphere decoding by ordering them according to increasing partial Euclidean distances during sphere decoding. Simulations have shown that the deviation of the search sequence ordering according to the invention from the exact Euclidean distance ordering is negligible for soft-decision sphere decoding.

The invention claimed is:

1. A method for defining a search sequence for a soft-decision sphere decoding algorithm for use in receivers for quadrature amplitude modulation (QAM) communication signals, comprising:
   determining a first member of the search sequence by rounding a received symbol (z) to a first constellation symbol ($x_c$) of a plurality of constellation symbols ($x_i$) which form a QAM constellation, said first constellation symbol being the constellation symbol closest to the received symbol (z); and
   determining the remaining members of the search sequence by:
   classifying, with a processing unit, the remaining constellation symbols of the QAM constellation into a plurality of sub-sets of constellation symbols having the same distance metric relative to said first constellation symbol ($x_c$) according to a metric $d_{sequ(n)}=2a\cdot n=\max\{|\text{real}(x_c-x_i)|, |\text{imag}(x_c-x_i)|\}$, wherein a is a non-zero scaling factor of the constellation grid, the constellation symbols being spaced by 2a in both horizontal and vertical directions, and n is a non-zero integer, and
   ordering said sub-sets of constellation symbols in ascending order of their distance metric relative to the first constellation symbol ($x_c$), and
   ordering the members of each sub-set of constellation symbols that are defined by the same distance metric according to their Euclidean distances.

2. The method of claim 1, wherein said ordering step of the members of each subset according to their Euclidean distances comprises ordering the member symbols into sets having the same Euclidean distance relative to the first constellation symbol ($x_c$), with ascending order of the Euclidean distance of the sets.

3. The method of claim 2, wherein said ordering step of the members of each subset according to their Euclidean distances comprises ordering the symbols among a set of symbols having the same Euclidean distance relative to the first constellation symbol ($x_c$) by predefining a succession of these symbols and maintaining said succession for any set throughout the algorithm.

* * * * *